(12) United States Patent
Tsai et al.

(10) Patent No.: US 8,087,198 B2
(45) Date of Patent: Jan. 3, 2012

(54) COMBINED ILLUMINATED RETICLE SWITCH AND FOCUS KNOB FOR SIGHT

(75) Inventors: Tsung-Mou Tsai, Taichung (TW); Yu-Sheng Lin, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 280 days.

(21) Appl. No.: 12/436,867

(22) Filed: May 7, 2009

(65) Prior Publication Data
US 2010/0157292 A1    Jun. 24, 2010

(30) Foreign Application Priority Data

Dec. 23, 2008  (TW) ................................ 97150205 A

(51) Int. Cl.
*F41G 1/32* (2006.01)
(52) U.S. Cl. ................ 42/131; 42/132; 42/146; 362/110
(58) Field of Classification Search ............ 42/131, 42/132, 145, 146; 362/110
See application file for complete search history.

(56) References Cited

U.S. PATENT DOCUMENTS

| | | | | |
|---|---|---|---|---|
| 3,645,635 | A * | 2/1972 | Steck | 356/252 |
| 5,065,538 | A * | 11/1991 | Allen | 42/142 |
| 6,196,702 | B1 * | 3/2001 | Krietzman | 362/259 |
| 6,721,095 | B2 * | 4/2004 | Huber | 359/427 |
| 6,729,062 | B2 * | 5/2004 | Thomas et al. | 42/122 |
| RE39,686 | E * | 6/2007 | Khoshnood | 33/265 |
| 7,225,578 | B2 * | 6/2007 | Tai | 42/132 |
| 7,399,100 | B1 * | 7/2008 | Plyaskin | 362/110 |
| 7,530,193 | B2 * | 5/2009 | Williamson et al. | 42/145 |
| 7,651,237 | B2 * | 1/2010 | Stenton | 362/110 |
| 7,877,921 | B1 * | 2/2011 | Stenton | 42/123 |
| 2006/0230665 | A1 * | 10/2006 | Narcy et al. | 42/123 |
| 2008/0060248 | A1 * | 3/2008 | Pine et al. | 42/114 |

* cited by examiner

*Primary Examiner* — Michael David
(74) *Attorney, Agent, or Firm* — Thomas|Kayden

(57) ABSTRACT

A sight. A saddle is connected between an ocular housing and an objective housing. A crosshair is disposed in the ocular housing. A light-emitting element is disposed in the ocular housing, illuminating the crosshair. A focal adjustment member is disposed on the saddle, adjusting an objective focus for the sight. A key-type member is connected to the focal adjustment member and is electrically connected to the light-emitting element, controlling operation of the light-emitting element and adjusting luminous brightness thereof.

4 Claims, 4 Drawing Sheets

COMBINED ILLUMINATED RETICLE SWITCH AND FOCUS KNOB FOR SIGHT

CROSS REFERENCE TO RELATED APPLICATIONS

This application claims priority of Taiwan patent application No. 097150205, filed on Dec. 23, 2008, the entirety of which is incorporated by reference herein.

BACKGROUND OF THE INVENTION

1. Field of the Invention

The invention relates to a sight, and more particularly to a sight with a key-type member having a battery.

2. Description of the Related Art

Generally, a sight is provided with functions of focus and crosshair adjustment. Recognition of a crosshair in the sight is often accomplished by irradiation of a light-emitting element.

Referring to FIG. 1, a conventional sight 1 comprises a saddle 10, an ocular housing 20, an objective housing 30, a focal adjustment member 40, a first crosshair adjustment member 51, a second crosshair adjustment member 52, and a resistor-type control switch 60.

The saddle 10 is connected between the ocular housing 20 and the objective housing 30.

The focal adjustment member 40, first crosshair adjustment member 51, and second crosshair adjustment member 52 are disposed on the saddle 10. Here, the focal adjustment member 40 can adjust the position of an objective lens or multiple objective lenses (not shown) disposed in the objective housing 30, thereby adjusting an objective focus. Moreover, the first crosshair adjustment member 51 and second crosshair adjustment member 52 can adjust the position of a crosshair (not shown, such as a cross-pillar) disposed in the ocular housing 20. For example, the first crosshair adjustment member 51 can drive the crosshair to move upward and downward, and the second crosshair adjustment member 52 can drive the crosshair to move leftward and rightward.

The resistor-type control switch 60 is disposed on the ocular housing 20, controlling on/off operation of a light-emitting element (not shown) disposed in the ocular housing 20 and adjusting luminous brightness thereof. Here, the resistor-type control switch 60 can provide functions of electric conduction, electric disconnection, and predetermined multi-stage adjustment. Specifically, the on/off operation and luminous brightness adjustment of the light-emitting element can be performed by turning a knob 61 of the resistor-type control switch 60. Moreover, the crosshair (or cross-pillar) is composed of a reflective material. When light from the light-emitting element irradiates the crosshair, the crosshair reflects the light. Thus, the crosshair can be clearly recognized or observed.

Accordingly, the focal adjustment member 40 and resistor-type control switch 60 are respectively disposed in different positions on the sight 1. When the focal adjustment, the on/off operation of the light-emitting element, and the adjustment of the luminous brightness of the light-emitting element are performed, an operator's hands must move back and forth along the sight 1, thereby causing operational inconvenience. Moreover, the resistor-type control switch 60 must be operated by turning the knob 61 with the hands, further causing operational inconvenience.

Hence, there is a need for a sight that can effectively enhance operational convenience.

BRIEF SUMMARY OF THE INVENTION

A detailed description is given in the following embodiments with reference to the accompanying drawings.

An exemplary embodiment of the invention provides a sight comprising an ocular housing, an objective housing, a saddle, a crosshair, a light-emitting element, a focal adjustment member, and a key-type member. The saddle is connected between the ocular housing and the objective housing. The crosshair is disposed in the ocular housing. The light-emitting element is disposed in the ocular housing, illuminating the crosshair. The focal adjustment member is disposed on the saddle, adjusting an objective focus for the sight. The key-type member is connected to the focal adjustment member and is electrically connected to the light-emitting element, controlling operation of the light-emitting element and adjusting luminous brightness thereof.

The key-type member comprises a key, a membrane switch, a first circuit board, a second circuit board, a control chip, and a cell. The membrane switch is electrically connected to the first circuit board and corresponds to the key. The second circuit board is electrically connected to the first circuit board and control chip. The cell comprises a first power connection pin and a second power connection pin. The first power connection pin is electrically connected to the control chip. The light-emitting element is electrically connected between the control chip and the second power connection pin of the cell.

The focal adjustment member comprises an inner threaded portion. The key-type member comprises an outer threaded portion engaging the inner threaded portion.

The sight further comprises a first crosshair adjustment member and a second crosshair adjustment member. The first crosshair adjustment member and second crosshair adjustment member are disposed on the saddle, adjusting the position of the crosshair disposed in the ocular housing.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
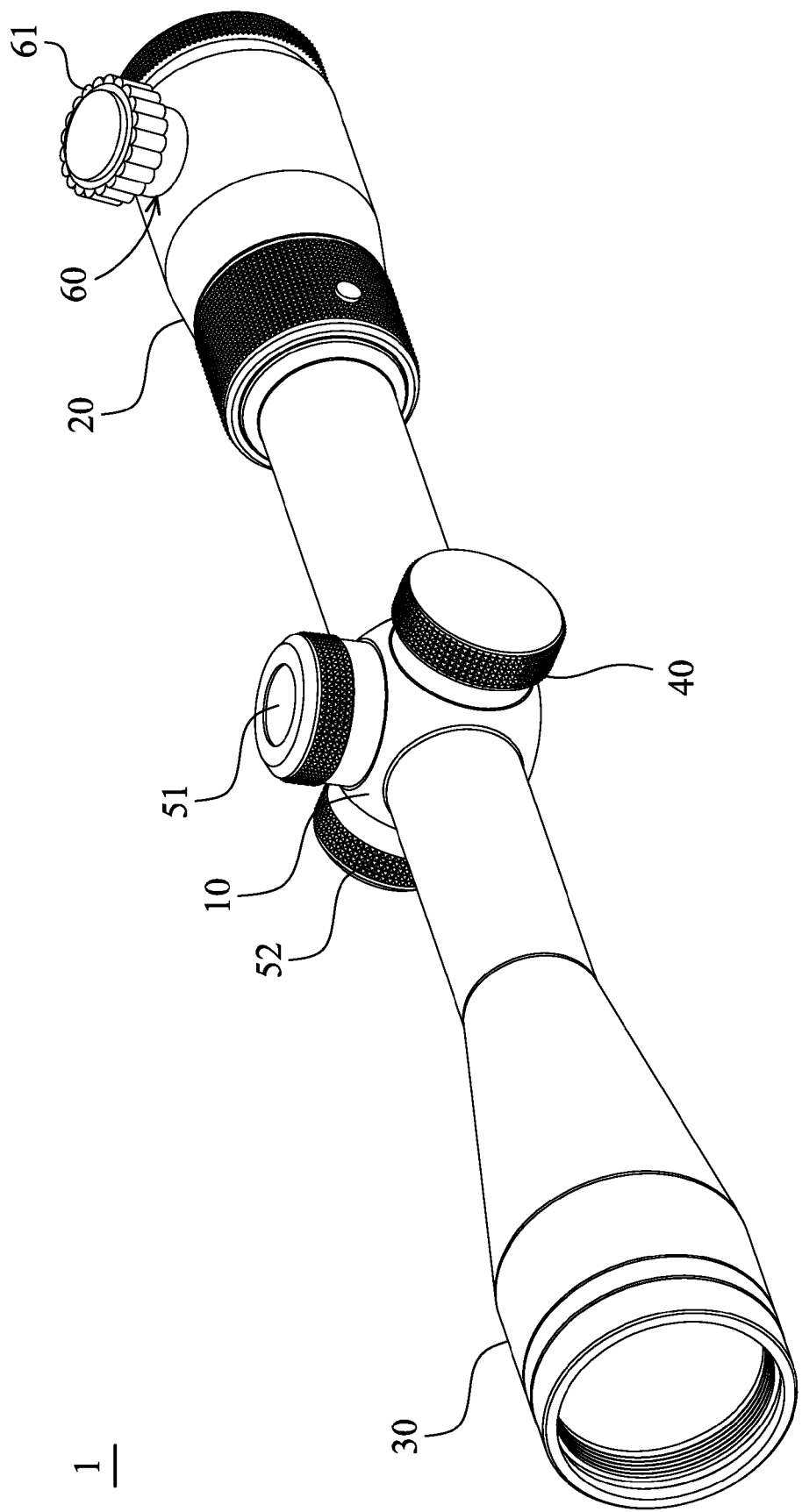
FIG. 1 is a schematic perspective view of a conventional sight.
Figure 2:
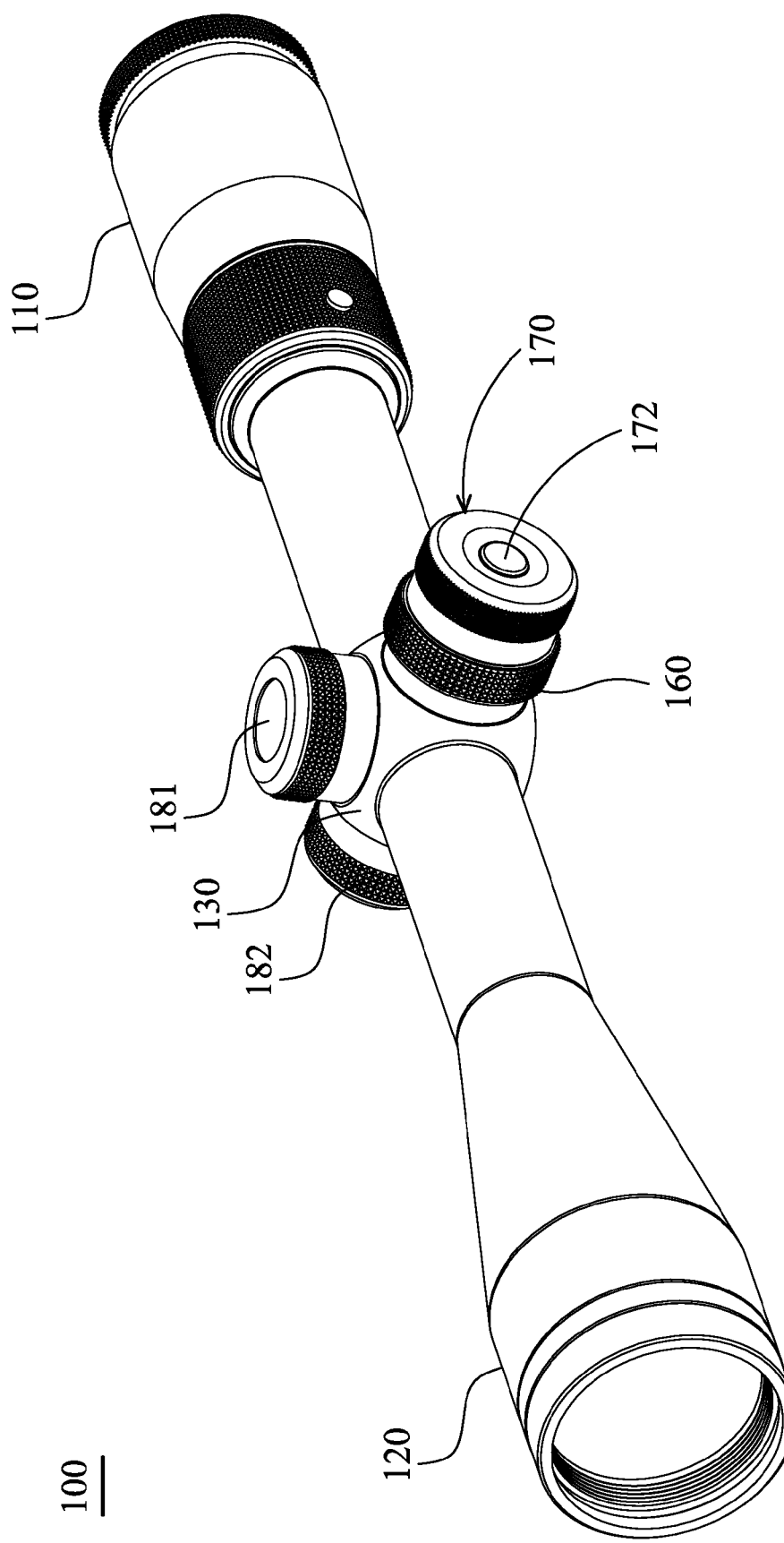
FIG. 2 is a schematic perspective view of a sight of the invention.
Figure 3:
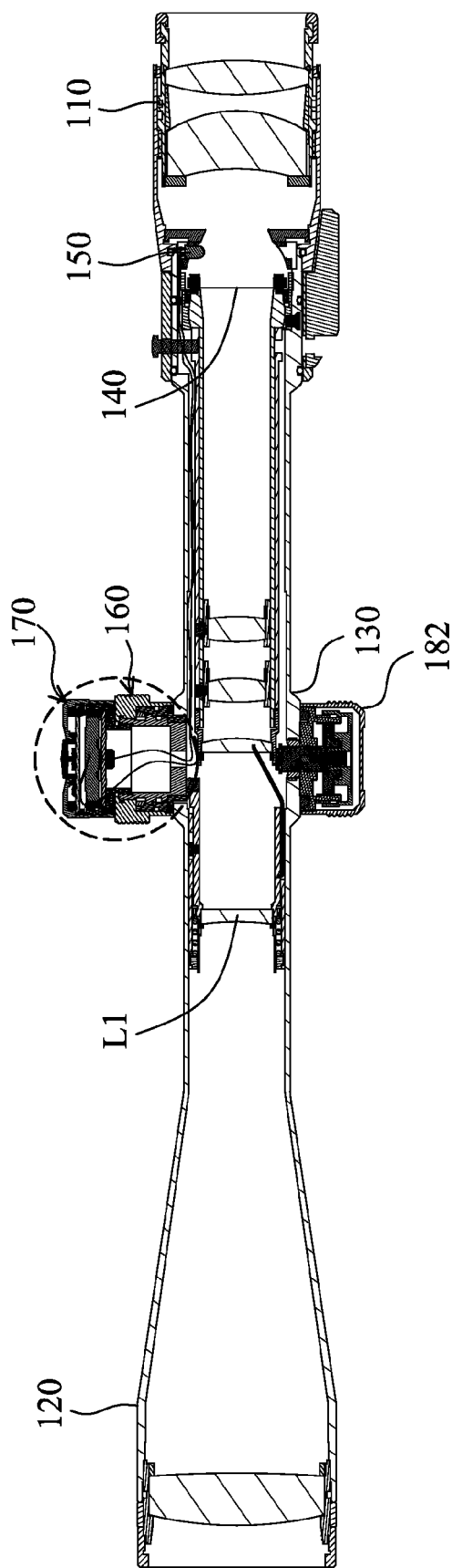
FIG. 3 is a schematic cross section of the sight of the invention.

Referring to FIG. 2 and FIG. 3, a sight 100 comprises an ocular housing 110, an objective housing 120, a saddle 130, a crosshair 140, a light-emitting element 150, a focal adjustment member 160, a key-type member 170, a first crosshair adjustment member 181, and a second crosshair adjustment member 182.

The saddle 130 is connected between the ocular housing 110 and the objective housing 120.

As shown in FIG. 3, the crosshair 140 is disposed in the ocular housing 110. Here, the crosshair 140 may be a cross-pillar and is composed of a reflective material.

The light-emitting element 150 is disposed in the ocular housing 110, illuminating the crosshair 140. In this embodiment, the light-emitting element 150 is disposed near the crosshair 140 and may be a light-emitting diode (LED).

The focal adjustment member 160 is disposed on the saddle 130, adjusting an objective focus for the sight 100. Specifically, the focal adjustment member 160 is rotatably disposed on the saddle 130. Accordingly, when the focal adjustment member 160 is rotated, the position of an objective lens (such as an objective lens L1 shown in FIG. 3) disposed in the objective housing 120 can be adjusted, thereby adjusting the objective focus. Moreover, as shown in FIG. 4, the focal adjustment member 160 comprises an inner threaded portion 161.

Figure 4:
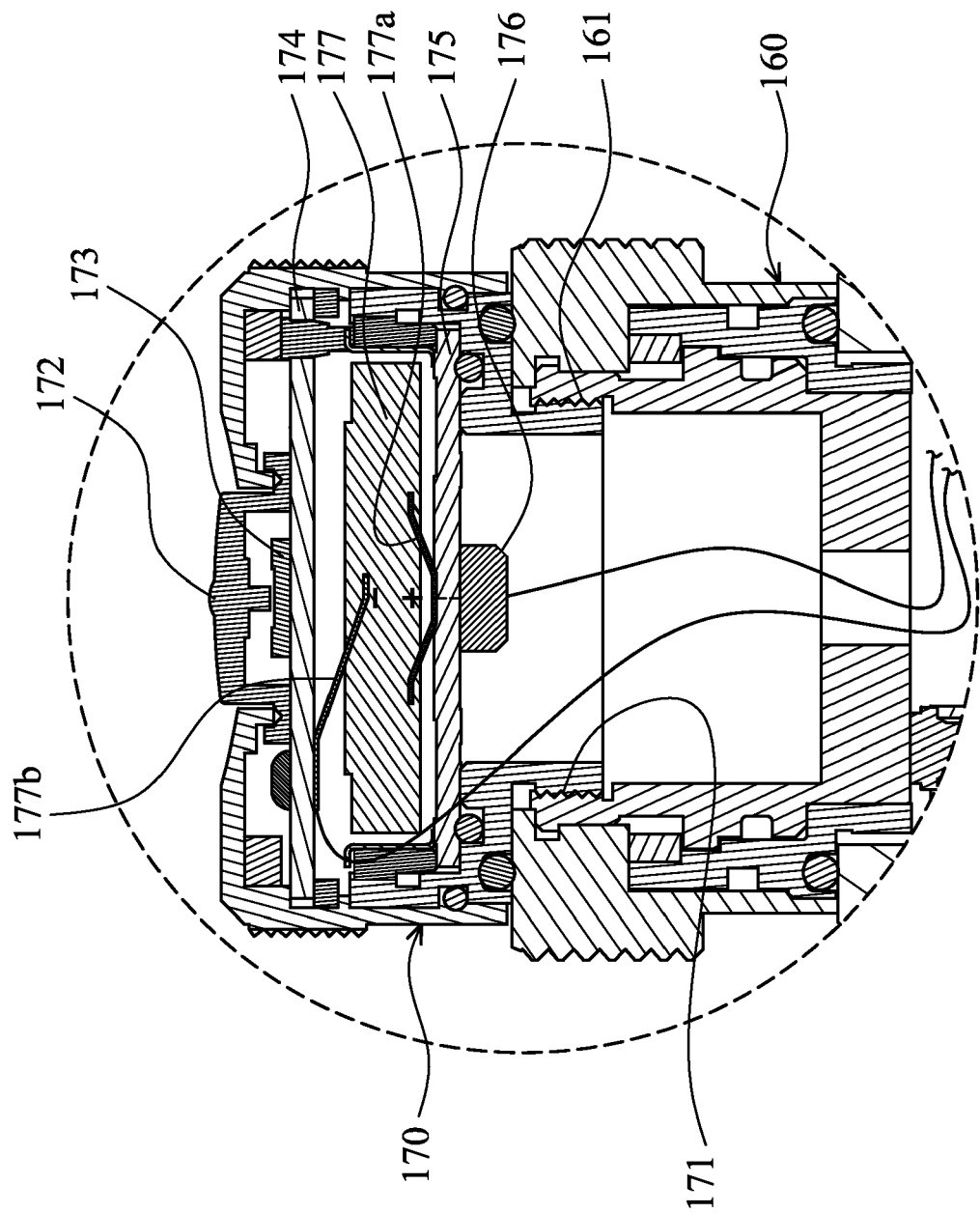
FIG. 4 is a partial enlarged view of FIG. 3.

As shown in FIGS. 2, 3, and 4, the key-type member 170 is connected to the focal adjustment member 160 and is electrically connected to the light-emitting element 150 disposed in the ocular housing 110. Specifically, as shown in FIG. 4, the key-type member 170 comprises an outer threaded portion 171, a key 172, a membrane switch 173, a first circuit board 174, a second circuit board 175, a control chip 176, and a cell 177. The outer threaded portion 171 of the key-type member 170 engages the inner threaded portion 161 of the focal adjustment member 160. The membrane switch 173 is electrically connected to the first circuit board 174 and corresponds to the key 172. The second circuit board 175 is electrically connected to the first circuit board 174 and control chip 176. The cell 177 comprises a first power connection pin 177a and a second power connection pin 177b. As shown in FIG. 3 and FIG. 4, the first power connection pin 177a is electrically connected to the control chip 176 and the light-emitting element 150 is electrically connected between the control chip 176 and the second power connection pin 177b. Moreover, the control chip 176 can provide functions of electric conduction, electric disconnection, and predetermined multi-stage adjustment.

As shown in FIG. 2, the first crosshair adjustment member 181 and second crosshair adjustment member 182 are disposed on the saddle 130, adjusting the position of the crosshair 140 disposed in the ocular housing 110. Specifically, the first crosshair adjustment member 181 and second crosshair adjustment member 182 are rotatably disposed on the saddle 130. For example, the first crosshair adjustment member 181 can drive the crosshair 140 to move upward and downward in the ocular housing 110 when rotated, and the second crosshair adjustment member 182 can drive the crosshair 140 to move leftward and rightward in the ocular housing 110 when rotated.

The following description is directed to on/off operation of the light-emitting element 150 and adjustment of luminous brightness thereof using the key-type member 170.

As shown in FIG. 4, when the key 172 is pressed to contact the membrane switch 173, the membrane switch 173 outputs a signal to the control chip 176 via the first circuit board 174 and second circuit board 175. At this point, the control chip 176, based on the signal, performs corresponding operations. For example, when the key 172 is pressed once, the control chip 176 enables electric conduction between the cell 177 and the light-emitting element 150, such that the light-emitting element 150 can acquire electric power to irradiate. Here, light from the light-emitting element 150 irradiates the crosshair 140 composed of the reflective material, enabling the crosshair 140 in the sight 100 to be clearly recognized or observed. When the key 172 is pressed once again, the control chip 176 providing the functions of predetermined multi-stage adjustment can gradually increase the magnitude of a voltage supplied to the light-emitting element 150 from the cell 177, thereby gradually increasing the luminous brightness of the light-emitting element 150. When the key 172 is pressed to complete a predetermined circulation, the control chip 176 disconnects the cell 177 from the light-emitting element 150, such that the light-emitting element 150 can no longer acquire the electric power and thus cannot irradiate.

Accordingly, the focal adjustment member 160 and key-type member 170 are disposed in the same position on the sight 100. When the focal adjustment, the on/off operation of the light-emitting element 150, and the adjustment of the luminous brightness of the light-emitting element 150 are performed, an operator's hands can correspondingly operate in the same position and are not required to move back and forth along the sight 100. Thus, operational convenience of the sight 100 is enhanced. Moreover, as the key-type member 170 is operated by simply pressing the key 172 with the hands, the operational convenience of the sight 100 is further enhanced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A sight, comprising:
   an ocular housing;
   an objective housing;
   a saddle connected between the ocular housing and the objective housing;
   a crosshair disposed in the ocular housing;
   a light-emitting element disposed in the ocular housing, illuminating the crosshair;
   a focal adjustment member disposed on the saddle, adjusting an objective focus for the sight; and
   a key-type member connected to the focal adjustment member and electrically connected to the light-emitting element, controlling operation of the light-emitting element and adjusting luminous brightness thereof, wherein the key-type member comprises a key, a control switch, a first circuit board, a second circuit board, a control chip, and a cell, the control switch is electrically connected to the first circuit board and corresponds to the key, the second circuit board is electrically connected to the first circuit board and control chip, the cell comprises a first power connection pin and a second power connection pin, the first power connection pin is electrically connected to the control chip, and the light-emitting element is electrically connected between the control chip and the second power connection pin of the cell.

2. The sight as claimed in claim 1, wherein the focal adjustment member comprises an inner threaded portion, and the key-type member comprises an outer threaded portion engaging the inner threaded portion.

3. The sight as claimed in claim 1, further comprising a first crosshair adjustment member and a second crosshair adjustment member, wherein the first crosshair adjustment member and second crosshair adjustment member are disposed on the saddle, adjusting the position of the crosshair disposed in the ocular housing.

4. The sight as claimed in claim 1, wherein the control switch comprises a membrane switch.

* * * * *